(12) United States Patent
Salugu et al.

(10) Patent No.: US 9,153,948 B2
(45) Date of Patent: Oct. 6, 2015

(54) SYSTEM AND METHOD FOR ACTUATION OF POWER PANEL

(71) Applicant: General Electric Company, Schenectady, NY (US)

(72) Inventors: Srinivas Salugu, Hyderabad (IN); Sudarshan Allada, Hyderabad (IN); Pravin Pralhad Kulkarni, Hyderabad (IN)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 13/764,755

(22) Filed: Feb. 11, 2013

(65) Prior Publication Data

US 2014/0226262 A1    Aug. 14, 2014

(51) Int. Cl.
 H02B 1/00    (2006.01)
 H02B 1/04    (2006.01)
 H02B 11/127  (2006.01)

(52) U.S. Cl.
 CPC .................................. H02B 11/127 (2013.01)

(58) Field of Classification Search
 CPC ............................. H05K 7/00; H02B 11/127
 USPC ....................................................... 361/610
 See application file for complete search history.

(56) References Cited

U.S. PATENT DOCUMENTS

| | | | |
|---|---|---|---|
| 2,130,250 A * | 9/1938 | Reed .............................. | 361/610 |
| 2,994,807 A * | 8/1961 | Devine et al. ................. | 361/727 |
| 3,643,473 A | 2/1972 | Strong | |
| 3,662,225 A * | 5/1972 | Carter et al. .................. | 361/784 |
| 3,767,874 A | 10/1973 | Wilson | |
| 3,784,764 A | 1/1974 | Wilson | |
| 3,823,281 A | 7/1974 | Wilson | |
| 4,072,029 A | 2/1978 | Harlow et al. | |
| 4,101,744 A | 7/1978 | Wilson | |
| 4,815,712 A | 3/1989 | Kawada | |
| 4,909,357 A | 3/1990 | Kawada | |
| 5,222,419 A | 6/1993 | Spector | |
| 5,278,722 A | 1/1994 | Peruso | |
| 6,015,960 A | 1/2000 | Girodet et al. | |
| 6,028,272 A | 2/2000 | Akers | |
| 6,400,245 B1 | 6/2002 | Castonguay et al. | |
| 6,409,029 B1 | 6/2002 | Bermes | |
| 6,512,669 B1 * | 1/2003 | Goodwin et al. ............. | 361/601 |
| 6,689,968 B2 | 2/2004 | Trivette et al. | |
| 7,127,341 B2 | 10/2006 | Whang | |
| 7,518,863 B2 * | 4/2009 | Wayman et al. .............. | 361/690 |
| 7,621,926 B2 | 11/2009 | Wixey et al. | |
| 7,688,572 B2 * | 3/2010 | Yee et al. ....................... | 361/614 |
| 7,821,775 B2 | 10/2010 | Narayanasamy et al. | |
| 8,194,293 B2 | 6/2012 | Suto | |
| 8,665,582 B2 * | 3/2014 | Robinson et al. ............. | 361/644 |
| 8,727,458 B2 * | 5/2014 | Peterson ........................ | 312/303 |
| 2001/0026436 A1 * | 10/2001 | Tanzer et al. .................. | 361/610 |
| 2006/0256303 A1 | 11/2006 | Hamada | |

* cited by examiner

*Primary Examiner* — Gregory Thompson
(74) *Attorney, Agent, or Firm* — Fletcher Yoder, P.C.

(57) ABSTRACT

A system includes a power panel actuation system configured to translate a power panel within a panel connection rack. The power panel actuation system includes an input shaft and a plurality of cams coupled to the input shaft, wherein the plurality of cams is configured to engage with the power panel upon rotation of the input shaft, and the plurality of cams is configured to linearly translate the power panel within the panel connection rack.

20 Claims, 7 Drawing Sheets

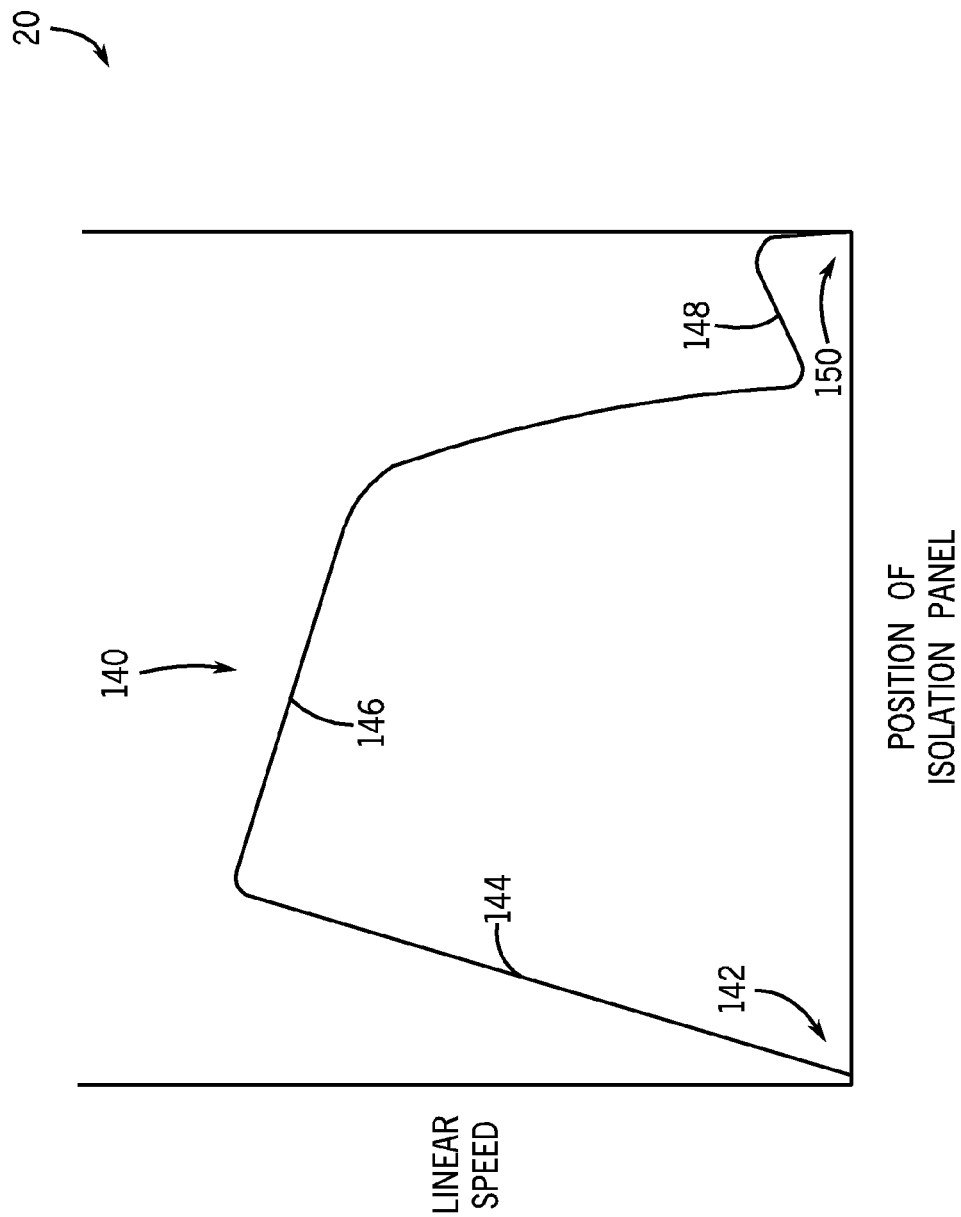

SYSTEM AND METHOD FOR ACTUATION OF POWER PANEL

BACKGROUND OF THE INVENTION

The subject matter disclosed herein relates to electrical systems, and more specifically, to systems and methods to actuate one or more power panels.

Power panels may contain various electrical components, such as circuit breakers and transfer switches, which connect a power source to a load. These electrical components enable the panel to selectively route electrical current from the power source to the load. For example, a transfer switch may selectively connect the load to a first power source or a second power source. When the first power source is unavailable, the transfer switch may open or close to connect the load to the second power source. Periodic maintenance of the power panel and its components may be desirable in order to maintain the operability of the power panel. To this end, it may be desirable to move, actuate, and/or separate the power panel in order to position the power panel for efficient maintenance. Unfortunately, movement of the power panel may result in rotation or tilting of the panel, thereby decreasing the efficiency of this movement.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a power panel actuation system configured to translate a power panel within a panel connection rack. The power panel actuation system includes an input shaft and a plurality of cams coupled to the input shaft, wherein the plurality of cams is configured to engage with the power panel upon rotation of the input shape, and the plurality of cams is configured to linearly translate the power panel within the panel connection rack.

In a second embodiment, a method includes decoupling an power panel from a panel connection rack with a plurality of cams configured to engage with the power panel upon rotation of an input shaft, linearly translating the power panel with the plurality of cams at a first speed for a first linear distance, and linearly translating the power panel with the plurality of cams at a second speed for a second linear distance, wherein the second speed is greater than the first speed.

In a third embodiment, a system includes a panel actuation system having an input shaft and a plurality of cams coupled to the input shaft and configured to convert rotation of the input shaft into linear movement of a power panel relative to a panel connection rack, and wherein the plurality of cams are configured to maintain a vertical orientation of the power panel during the linear movement of the power panel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 is a graphical illustration of an embodiment of a non-constant linear speed profile of the moving power panel.

DETAILED DESCRIPTION OF THE INVENTION

Figure 1:
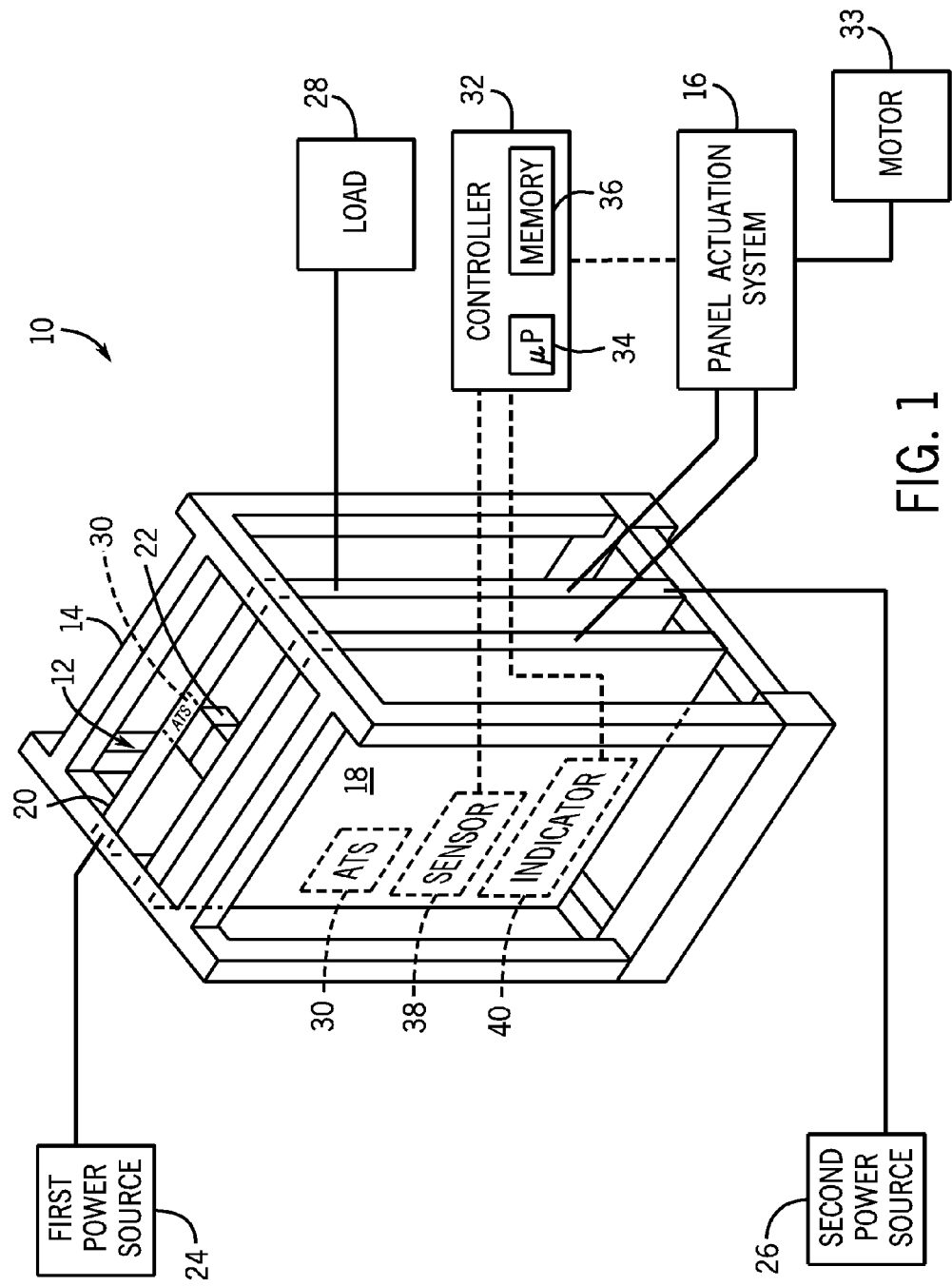
FIG. 1 is a schematic diagram of an embodiment of a racking system having electrical panels, illustrating a panel actuation system that may move one or more of the electrical panels.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed toward systems and methods for actuating power panels. As will be appreciated, a first power panel (e.g., a front panel), which may route power from one or more power sources to a load, may be physically and electrically coupled to a second power panel (e.g., a back power panel) of a power panel system during operation. In order to perform maintenance on the first power panel, it may be desirable to isolate, separate, and move the first power panel away from the second power panel. To this end, a panel actuation system may include a set of linkages and a plurality of cams coupled to the linkages configured to enable movement and separation of the first power panel from the second power panel. In certain embodiments, the plurality of cams may include first, second, third, and fourth cams disposed in a rectangular arrangement in order to reduce tilting (e.g., with respect to a vertical plane) of the first power panel as it moves, thereby reducing the amount of force needed to move the first power panel.

Furthermore, the cams may be designed to impart a non-constant linear speed to the first power panel, as the panel actuation system translates (e.g., actuates or moves) the first power panel. For example, as the first power panel is initially translated into position for coupling to the second power panel, the panel actuation system may move the first power panel with an increased linear velocity to enable faster and more efficient translation of the first power panel. Thereafter, as the first power panel nears the second power panel, the cams may be configured to decrease the linear translation velocity of the first power panel, thereby increasing the force acting on the first power panel as it is coupled to the second power panel. In this manner, the mechanical advantage or force acting on the first power panel as it is connected to the second power panel may be increased, thereby improving the panel connection process. Still further, in certain embodiments, the panel actuation system may include one or more physical stops to limit the movement and/or torque applied to the first power panel, thereby increasing the operability of the panel actuation system, the first power panel, and the various systems to which power is supplied via the first power panel.

Turning now to the figures, FIG. 1 illustrates a schematic of an embodiment of an electrical system 10 having a power panel system 12 disposed within a frame 14 (e.g., a panel connection rack). As shown, a panel actuation system 16 is coupled to the power panel system 12 and the frame 14. In order to enable maintenance of the power panel system 12, the panel actuation system 16 may actuate (e.g., move, couple, and/or separate) a first power panel 18 (e.g., a front power panel) away from a second power panel 20 (e.g., a back power panel). In certain embodiments, the second power panel 20 may be fixed to the frame 14. As explained in greater detail below, the panel actuation system 16 includes a system of linkages and cams that enable actuation of the first power panel 18. That is, the panel actuation system 16 is configured to move, translate, connect, and/or separate the first power panel 18 from the second power panel 20. Furthermore, the panel actuation system 16 may minimize tilting of the first power panel 18 during movement, may actuate the first power panel 18 with non-constant linear velocities across the frame 14, may include physical stops to limit movement or translation of the first power panel 18 beyond a certain point, or any combination thereof.

As illustrated, the first power panel 18 (e.g., main panel or isolation panel) is physically and electrically coupled to the second power panel 20 (e.g., backup panel) via a set of one or more electrical connectors 22. For example, the electrical connectors 22 may include a plug-and-socket arrangement that couples the first panel 18 to the second power panel 20. The first power panel 18 electively routes power from a first power source 24 or a second power source 26 toward a load 28. The load 28 may be any downstream user of electricity, such as a pump, motor, turbomachine, refrigeration system, gas turbine system, healthcare system, and/or the like. In certain embodiments, the first power source 24 may be a power grid or a main electrical generator, and the second power source 26 may be an auxiliary or backup generator. In order to selectively route power from either the first or second power sources 24 and 26, the first power panel 18 and the second power panel 20 may each include a transfer switch 30 (e.g., an automatic transfer switch). However, in certain embodiments, the second power panel 20 may not include the transfer switch 30. In operation, the transfer switch 30 may open or close in order to direct power from the first or second power sources 24 and 26 toward the load 28. For example, when the transfer switch 30 is in an open position, current may be routed from the first power source 24 (e.g., a power grid) to the load 28, while electrically isolating the load 28 from the second power source 26. When the transfer switch 30 closes, current may be routed from the second power source 26 (e.g., a backup generator) to the load, while electrically isolating the load 28 from the first power source 24.

As noted above, periodic maintenance of the first power panel 18 may be desirable in order to improve and/or maintain the operability of the electrical system 10. The panel actuation system 16 enables movement of the first power panel 18 in order to facilitate this maintenance. As shown, operation of the panel actuation system 16 may be controlled by a controller 32. It should be noted that the controller 32 may automatically operate the panel actuation system 16 (e.g., with an electric motor 33 or other drive), an operator may manually operate the panel actuation system 16, or both. To this end, the controller 32 includes one or more processors 34 and memory 36 in order to execute instructions to control the movement of the first power panel 18. These instructions may be encoded in software programs that may be executed by the processor 34. In addition, the instructions may be stored in a tangible, non-transitory, computer-readable medium, such as the memory 36. The memory 36 may include, for example, random-access memory, read-only memory, hard drives, and the like.

A sensor 38 (e.g., a sensor linkage, a position sensor, a motion sensor, an accelerometer, etc.) is coupled to the power panel system 12 in order to monitor an operating condition associated with the power panel system 12. For example, the sensor 38 may detect a position, a speed, an acceleration, a tilt or angle, or any combination thereof, associated with the first power panel 18 during movement or non-movement by the panel actuation system 16. The controller 32 may adjust the movement or speed of the first power panel 18 based on the feedback from the sensor 38. For example, it may be desirable to limit the physical movement of the first power panel 18 in order to reduce wear on the electrical system 10. To this end, the sensor 38 may detect position feedback of the first power panel 18. As will be appreciated, the sensor 38 may detect the position of the first power panel 18 as a percentage of a span (e.g., from 0 to 100 percent of a span), and the controller 32 may limit movement of the first power panel 18 based on the span. For example, the controller 32 may implement a software stop to limit a position of the first power panel 18 between approximately 10 to 90, 20 to 80, 30 to 70, or 40 to 60 percent of the span, or any subranges therebetween.

Furthermore, operation of the panel actuation system 16 may be governed by the operating condition detected by the sensor 38. That is, certain values of the operating condition may be indicative of different modes of operation of the electrical system 10 or the load 28. For example, when the sensor 38 detects that the first power panel 18 and the second power panel 20 are physically and electrically coupled together, an indicator may indicate that the electrical system 10 is an operational mode (e.g., an auto mode). However, when the first power panel 18 and the second power panel 20 are physically and electrically isolated from one another (e.g., after being separated by the panel actuation system 16), the indicator 40 may indicate that the electrical system 10 is in a non-operational mode (e.g., an isolated or test mode). In certain embodiments, while the electrical system 10 is in an isolated mode, the transfer switch 30 may be locked in place in order to enable maintenance of the power panel system 12. However, when the electrical system 10 is in the test mode, the transfer switch 30 may be adjusted in order to test the electrical system 10 while electrically isolated from the load 28.

Figure 2:
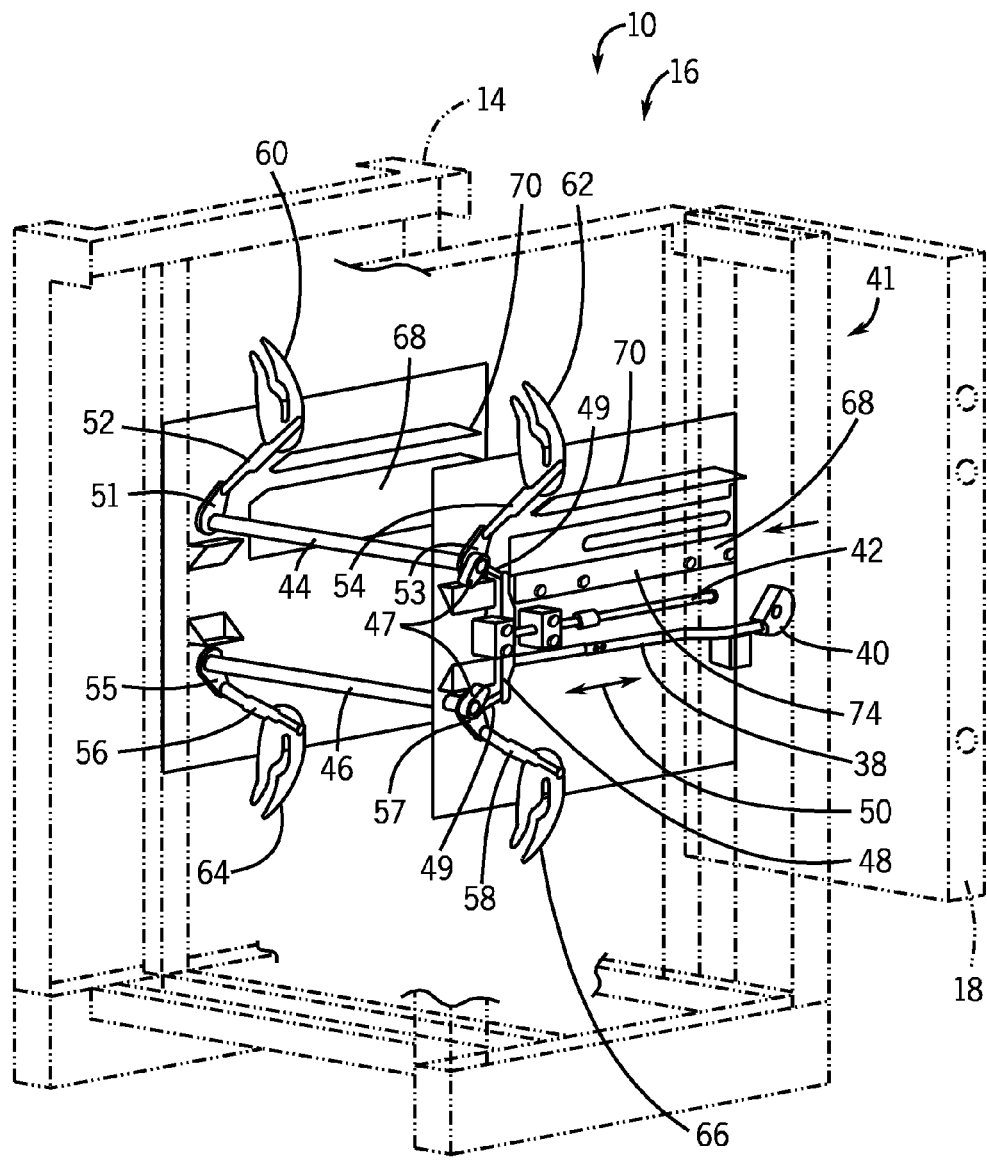
FIG. 2 is a perspective view of an embodiment of the panel actuation system of FIG. 1, illustrating a plurality of cams configured to impart a non-constant linear velocity to the moving electrical panels.

FIG. 2 is a perspective view of an embodiment of the panel actuation system 16. For clarity, the second power panel 20 is not shown. As illustrated, the front power panel 18 may be disposed within the frame 14 from a front side 41 of the frame 14, and, in the manner described below, the panel actuation system 16 may receive, translate, and position the front power panel 18 for coupling to the second power panel 20. The panel actuation system 16 includes an input shaft 42 coupled to first and second rotating shafts 44 and 46 via a bar 48 (e.g., vertical bar) and pivoting members 47 and 49 (also shown in FIG. 3). Rotation of the input shaft 42 (e.g., via manual operation, a motor, or drive system) results in linear movement of the bar 48, as illustrated by arrows 50. Linear movement of the input shaft 42 and the bar 48 is converted into rotary movement of the first and second rotating shafts 44 and 46 by the pivoting members 47 and 49, as described in greater detail below with respect to FIG. 3. Rotation of the first and second rotating shafts 44 and 46 results in movement of pivoting members 51, 53, 55, and 57 and lever arms 52, 54, 56, and 58, thereby rotating respective cams 60, 62, 64, and 66, and ultimately translating the first power panel 18. It should be noted that although four cams are illustrated, the panel actuation system 16 may include any number of cams. For example, the panel actuation system 16 may include 1, 2, 3, 4, 5, 6, or more cams and respective linkages in certain embodiments. As will be discussed in greater detail below, the profile of the cams 60, 62, 64, and 66 are configured to impart a non-constant linear speed to the moving first power panel 18. When the first power panel 18 and the second power panel 20 are physically coupled together, it may be desirable to slowly couple the first power panel 18 to the second power panel 20 in order to increase the force (e.g., mechanical advantage) acting on the first power panel 18 as the electrical connectors 22 of the power panel system 12 are connected. However, as the first power panel 18 is initially translated toward the second power panel 20, it may be desirable to translate the first power panel 18 at an increased linear speed in order to expedite connection of the power panel system 12.

The panel actuation system 16 includes multiple features in order to reduce tilting or rotation during the movement of the first power panel 18, which generally reduces the efficiency and operability of the panel actuation system 16. The four cams 60, 62, 64, and 66 are disposed in a rectangular arrangement (e.g., at respective corners of a rectangle). Accordingly, the load or weight applied to the first power panel 18 may be distributed between the four cams 60, 62, 64, and 66, and thereby stabilizing movement of the first power panel 18. It should be noted that other arrangements of the cams 60, 62, 64, and 66 may be suitable to reduce tilting (e.g., with respect to a vertical plane), twisting, and/or rotation of the first power panel 18. For example, the cams 60, 62, 64, and 66 may be positioned in a triangular, square, circular, polygonal, linear, elliptical, or another suitable arrangement to reduce tilting of the first power panel 18 (e.g., maintain parallelism between the first power panel 18 and the second power panel 20). In addition, the panel actuation system 16 includes a plurality of guides 68 and 70. The guides 68 and 70 direct movement of the first power panel 18 in a direction illustrated by the arrows 50. For example, a portion of the first power panel 18 may rest between the guides 68 and 70, thereby constraining movement of the first power panel 18 along the arrows 50 and reducing the possibility of twisting, tilting, and/or rotation. Although the panel actuation system 16 is illustrated with the two guides 68 and 70 (e.g., horizontal guides), the panel actuation system 16 may include any number of guides 68 and 70. For example, the panel actuation system 16 may include 1, 2, 3, 4, 5, 6, or more guides disposed on the frame 14. Additional features of the panel actuation system 16 are discussed below with respect to FIG. 3.

Figure 3:
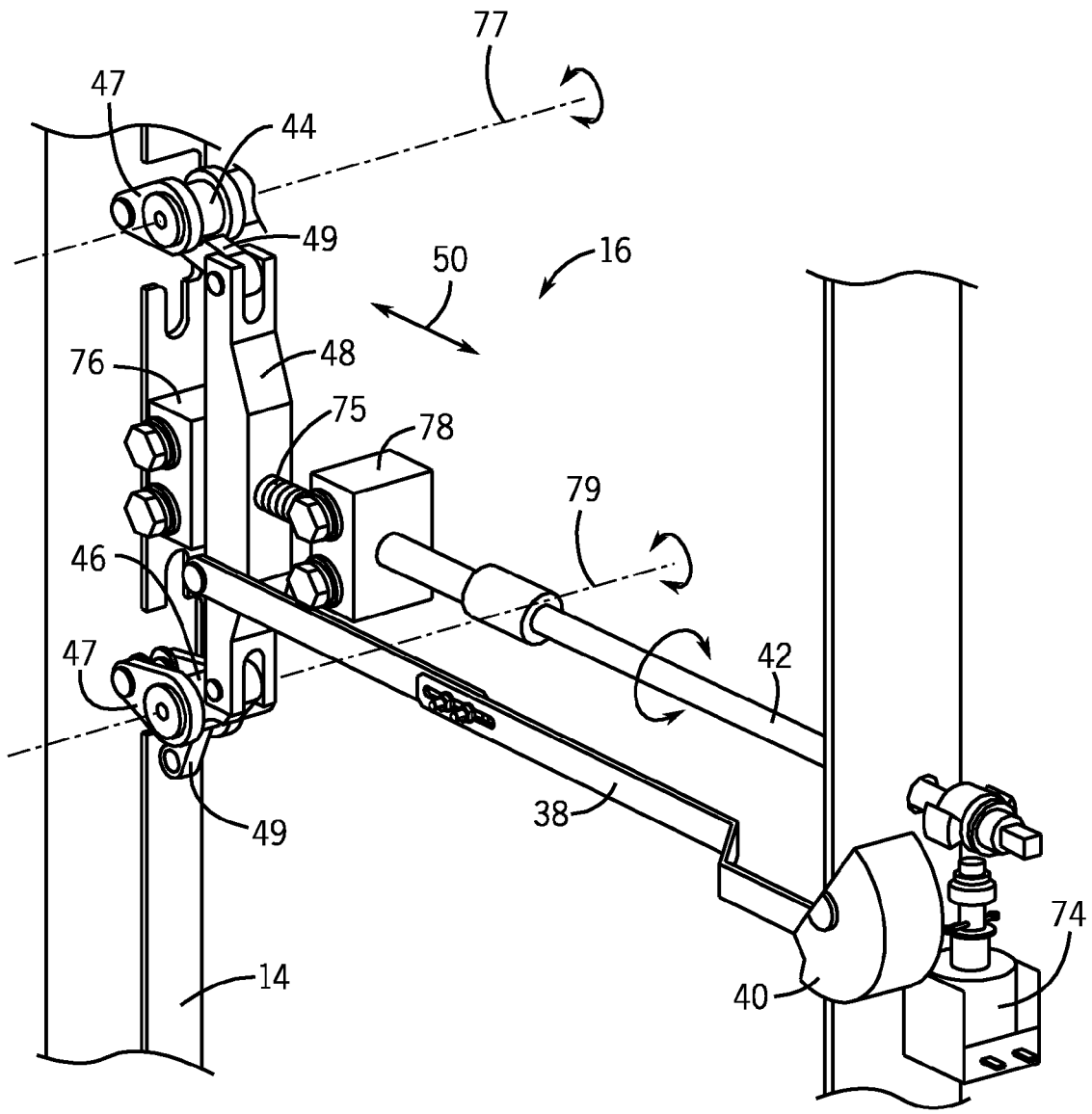
FIG. 3 is a perspective view of an embodiment of the panel actuation system of FIG. 2, illustrating a physical stop to limit the torque or movement of the electrical panels.

FIG. 3 is a partial perspective view of an embodiment of the panel actuation system 16 illustrating the indicator 40 coupled to the sensor 38 (e.g., sensor linkage). Again, the sensor 38 may detect an operating condition (e.g., a position) of the first power panel 18 and communicate the operating condition to the controller 32. The indicator 40 may display text, graphics, color coding, and/or the like as an indication of the operating mode of the electrical system 10, based on the feedback from the sensor 38. Furthermore, the controller 32 may control operation of the panel actuation system 16 based on the sensor feedback, and, in certain embodiments, may implement a software stop to limit the position of the electrical panel 12. However, it may be desirable to employ a physical stop to limit movement of the first power panel 18 either independently or in conjunction with the software stop. In the illustrated embodiment, the panel actuation system 16 further includes a racking lock solenoid 74 configured to block rotation of the shaft 42, and thereby block actuation of the panel actuation system 16. More specifically, the racking lock solenoid 74 may be configured to block rotation of the shaft 42 when circumstances or operating conditions do not allow for actuation of the panel actuation system 16. For example, the controller 32 may be configured to regulate operation of the racking lock solenoid 74 and/or the racking lock solenoid may block rotation of the shaft 42 when the electrical system 10 is an operational mode (e.g., an auto mode).

As mentioned above, the panel actuation system 16 may also include physical stops to block actuation or various movements of the panel actuation system 16. In the illustrated embodiment, the vertical bar 48 is disposed between two blocks 76 and 78, which physically limit movement of the bar 48. As mentioned above and described in more detail below, movement of the first power panel 18 is tied to the movement of the bar 48. In particular, the vertical bar 48 transfers rotational movement from the input shaft 42 to the rotating shafts 44 and 46. More specifically, the vertical bar 48 moves along threads 75 of the input shaft 42 as the input shaft 42 is rotated. In the manner described below, the linear movement of the vertical bar 48 (e.g., indicated by arrows 50) is transferred to rotational movement of the rotating shafts 44 and 46 by the pivoting members 47 and 49. Specifically, the rotating shaft 44 may rotate about an axis of rotation 77, and the rotating shaft 46 may rotate about an axis of rotation 79. As the rotating shafts 44 and 46 rotate about their respective axes of rotation (e.g., 77 and 79), the cams 60, 62, 64, and 66 are actuated, thereby moving the first power panel 18 in the manner described below. Therefore, as the blocks 76 and 78 limit movement of the vertical bar 48, the blocks 76 and 78 also limit the movement and position of the first power panel 18. In this manner, the blocks 76 and 78 may reduce the possibility of the first power panel 18 moving into undesirable positions within the frame 14 and may protect the electrical connectors 22. Once the vertical bar 48 reaches one of the blocks 76 or 78 as the vertical bar 48 translates along the threads 75 of the input shaft 42, further movement of the vertical bar 48 against the blocks 76 and 78 is limited or blocked. Additional force applied by the input shaft 42 to the vertical bar 48 is thereby applied directly to the blocks 76 and 78 rather than the remaining components of the panel actuation system 16, which improves the operability and lifespan of the panel actuation system 16. Accordingly, the other components of the panel actuation system 16 (e.g., cams, linkages, lever arms), may be designed with lower stress tolerances, thereby decreasing the weight, cost, and complexity of the panel actuation system 16.

Figure 4:
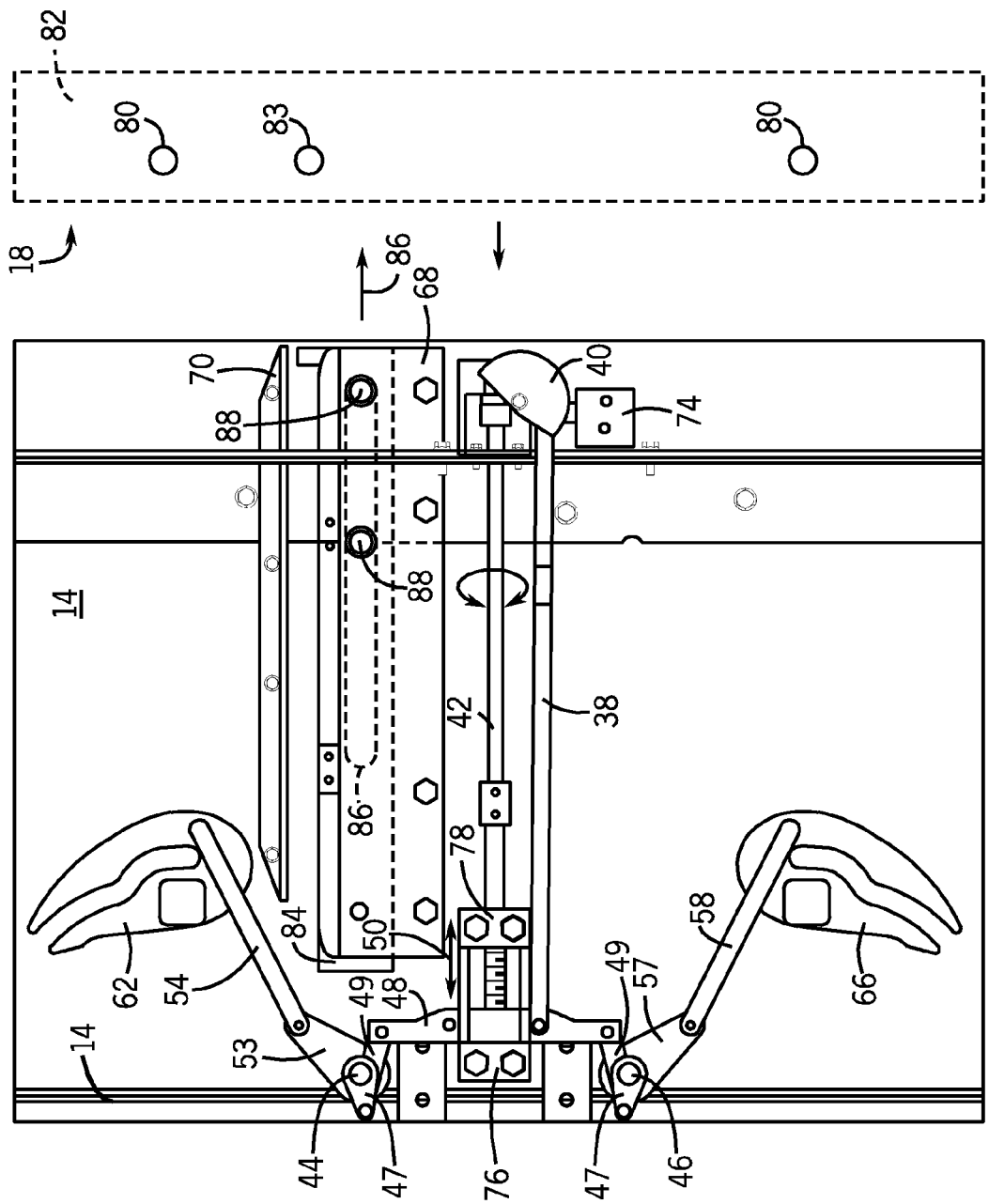
FIG. 4 is a side view of an embodiment of the panel actuation system of FIG. 2.

FIG. 4 is a side view of an embodiment of the panel actuation system 16, illustrating the various components that transfer rotary movement of the input shaft 42 into actuation of the cams 60, 62, 64, and 66. As described above, rotation of the input shaft 42 causes the vertical bar 48 to linearly translated, as indicated by arrows 50, along the threads 75 of the input shaft 42. As shown, the vertical bar 48 is coupled to pivoting members 49 of the panel actuation system 16, which are further coupled to pivoting members 47 of the panel actuation system 16. Additionally, the pivoting members 47 are fixedly attached to one of the rotating shafts 44 and 46. As such, when the vertical bar 48 moves linearly (e.g., along the arrows 50), the vertical bar 48 causes the pivoting members 49 to rotate, which subsequently causes the pivoting members 47 to rotate. As the pivoting members 47 are fixed to one of the rotating shafts 44 and 46, rotation of the pivoting members 47 causes the rotating shafts 44 and 46 to rotate (e.g., about the axes of rotation 77 and 79, respectively, shown in FIG. 3).

As shown, the pivoting member 53 is further fixedly attached to the rotating shaft 44, and the pivoting member 57 is fixedly attached to the rotating shaft 46. As such, when the rotating shafts 44 and 46 rotate, the pivoting members 53 and 57 also rotate. Pivoting member 53 is pivotably coupled to the lever arm 54, which is coupled to cam 62, as described above. Similarly, pivoting member 57 is pivotably coupled to lever arm 58, which is coupled to cam 66, as described above. Therefore, as the rotating shafts 44 and 46 rotate, the cams 62 and 66 are actuated. As mentioned above, as the cams 62 and 66 are actuated, the cams 62 and 66, along with the cams 60 and 64 shown in FIG. 2, may engage with the first power panel 18 and translate the first power panel 18 within the frame 14. Specifically, the first power panel 18 may include rollers 80 disposed on sides 82 of the first power panel 18, which engage with the cams 60, 62, 64, and 66, as described in detail below.

As mentioned above, the panel actuation system 16 may include guides 68 and 70 to direct movement of the first power panel 18. Specifically, the guides 68 and 70 may be configured to receive and support one or more rollers 83 of the first power panel 18 and horizontally direct the first power panel 18 within the frame 14 of the electrical system 10. In the illustrated embodiment, the panel actuation system 16 furthers includes an extendable guide 84. The extendable guide 84 is configured to further support the first power panel 18 through contact with one or more of the rollers 80 of the first power panel 18. Additionally, the extendable guide 84 may extend from the frame 14 (e.g., in a direction 86). In particular, the extendable guide 84 includes a slot 86 which may translate along supports 88 coupled to the frame 14. As a result, when the front power panel 18 is decoupled from the second power panel 20, the front power panel 18 may be linearly translated out of the frame 14 while still being supported by the extendable guide 84.

Figure 5:
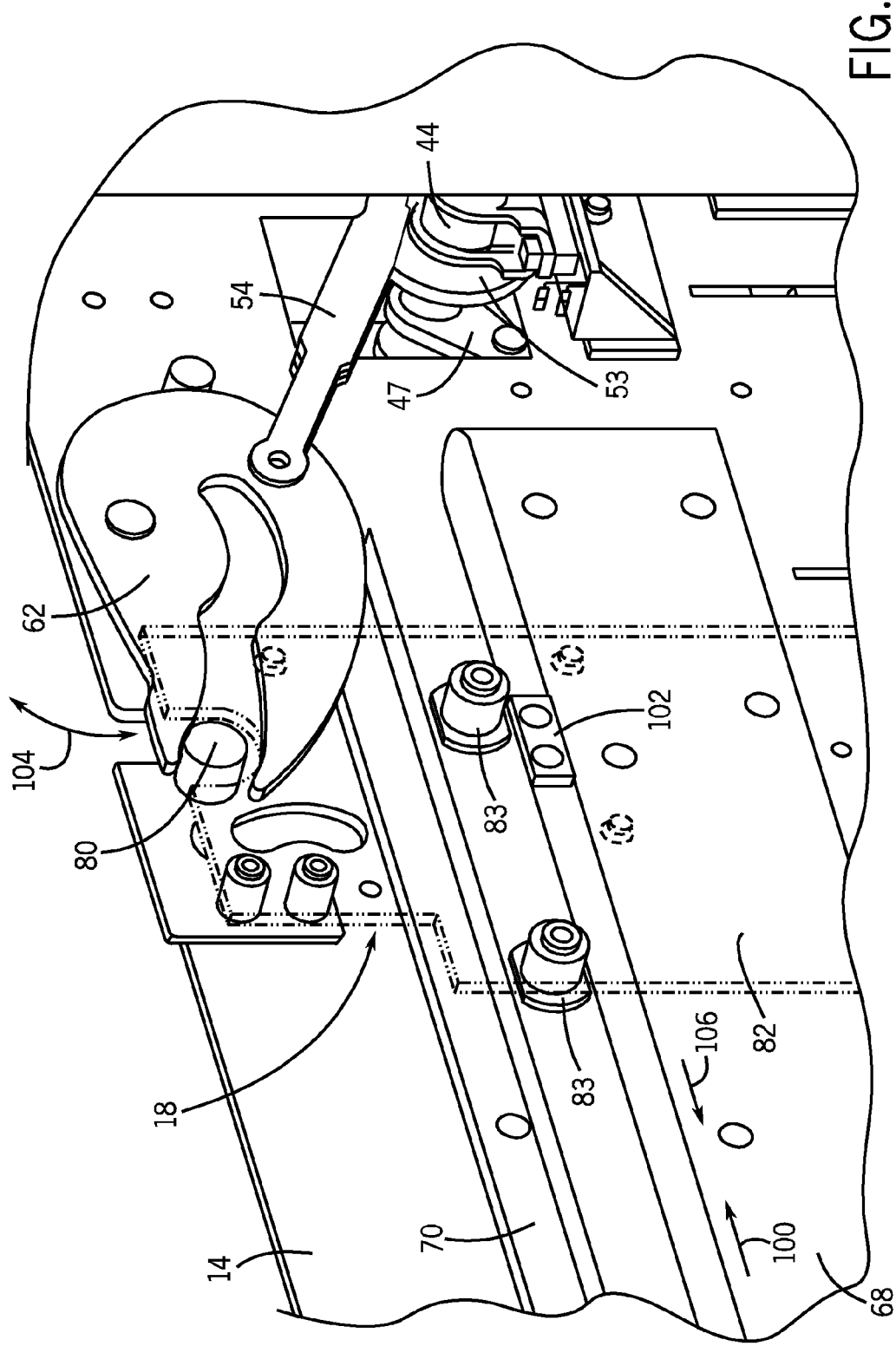
FIG. 5 is a partial perspective view of the panel actuation system of FIG. 2, illustrating a power panel engaging with a can of the panel actuation system.

FIG. 5 is a partial perspective view of the panel actuation system 16 engaging with the first power panel 18. For clarity, only one side 82 having roller 80 and rollers 83 of the first power panel 18 is shown. As mentioned above, the cams 60, 62, 64, and 66 are configured to engage with rollers 80 of the first panel 18 and enable translation of the first power panel 18 within the frame 14 of the electrical system 10. In the illustrated embodiment, the roller 80 on the side 82 of the first power panel 18 is shown engaging with the cam 62. As similarly discussed above, when the first power panel 18 is positioned to be coupled to the second power panel 20 within the frame 14, the first power panel 18 enters the frame 14 in the direction 100. As such, the rollers 83 of the first power panel 18 are captured between the guides 68 and 70, which guide the first power panel 18 in the direction 100 toward the second power panel 20 (not shown).

When the first power panel 18 is translated in the direction 100 for connection with the second power panel 20, one of the rollers 83 may contact and extend over an indention 102 of the guide 68. As will be appreciated, the indention 102 may indicate to an operator that the rollers 80 of the first power panel 18 are proximate to respective cams 60, 62, 64, and 66. As shown in the illustrated embodiment, the roller 80 on the side 82 of the first power panel 18 is engaged with the cam 62 of the panel actuation system 16. In the manner described above, rotation of the input shaft 42 will cause rotation of the cam 62, as indicated by arrows 104. As the cam 62 rotates, it will capture and engage with the roller 80 of the first power panel 18. Specifically, the cam 62 will enable linear translation of the first power panel 18 (e.g., in the direction 100) toward the second power panel 20 for connection to the second power panel 20. Similarly, rotation of the input shaft 42 (e.g., in an opposite direction) will cause rotation (e.g., opposite rotation) of the cam 62, thereby enabling linear translation of the first power panel 18 in a direction 106, causing disconnection of the first power panel 18 from the second power panel 20, and enabling removal of the first power panel 18 from the frame 14 of the electrical system 10. As discussed in detail below, the cams 60, 62, 64, and 66 each have a camming profile which enables a non-linear velocity of the first power panel 18 during linear translation of the first power panel 18.

Figure 6:
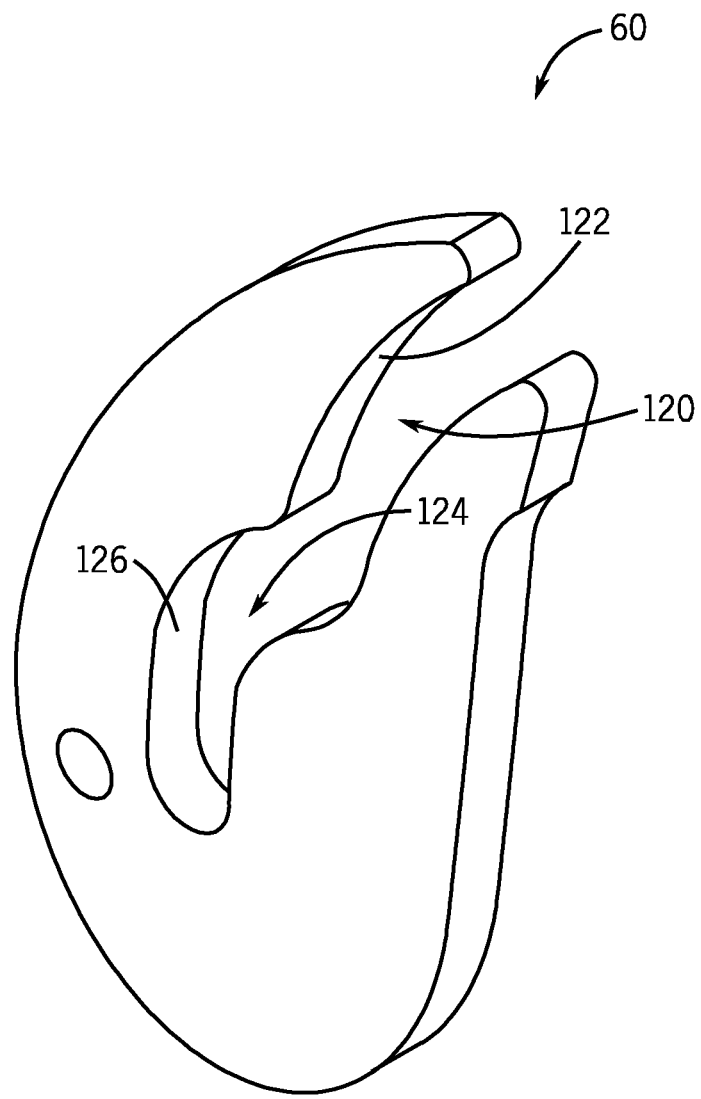
FIG. 6 is a perspective view of an embodiment of a cam of the panel actuation system of FIG. 2, illustrating a profile configured to impart a non-constant linear velocity to the moving power panel.

FIG. 6 is a perspective view of an embodiment of one of the cams 60, 62, 64, and 66 with a profile configured to impart a non-constant linear velocity to the first power panel 18. In the illustrated embodiment, the cam includes a first arcuate portion 120 (e.g., cam portion) having a first curvature 122 and a second arcuate portion 124 (e.g., cam portion) having a second curvature 126. The first and second curvatures 122 and 126 are different from one another. Furthermore, the second curvature 126 has a smaller radius of curvature than the first curvature 122. For example, the radius of the first curvature 122 may be approximately 5 to 90, 10 to 80, 20 to 70, or 30 to 60 percent of the radius of the second curvature 126. As a result, application of a constant force or torque results in less movement of the first power panel 18 when the roller 80 is within the second arcuate portion 124 and greater movement when the roller 80 is within the first arcuate portion 120. For example, due to the different radii of the first and second curvatures 122 and 126, the speed of the input shaft 42 may be constant while the translating speed of the first power panel 18 may vary. As noted earlier, it may be desirable to slow the linear movement of the first power panel 18 as it approaches the second power panel 20, in order to increase the force and mechanical advantage acting on the first power panel 18 during coupling of the first power panel 18 and the second power panel 20. Once the first power panel 18 moves a predetermined distance towards the second power panel 20 (e.g., once the roller 80 travels along the first arcuate portion 120), the roller 80 moves into the second arcuate portion 124, thereby decreasing the linear speed of the first power panel 18, and the force applied on the first power panel 18 by the cam 60 may increase. A chart illustrating the relationship between the linear speed of the first panel 18 relative to the distance from the second power panel 20 is shown in FIG. 7.

FIG. 7 is a graphical illustration where a line 140 represents an embodiment of the speed of the first power panel 18 as a function of position when a constant torque or speed is applied to the input shaft 42 of the panel actuation system 16. In the illustrated graph, the first power panel 18 is initially positioned within the frame 14 at a point 142. A first portion 144 of the line 140 shows the increasing speed of the first power panel 18 as the first power panel 18 is translated (e.g., manually pushed) towards the cams 60, 62, 64, and 66, as the first power panel 18 is guided by the guides 68 and 70. A second portion 146 of the line 140 shows the speed of the first power panel 18 as the first power panel 18 is translated within the frame 14 by the panel actuation system 16 while the first power panel 18 is engaged with the first arcuate portion 120 of the cams 60, 62, 64, and 66. Additionally, a third portion 148 of the line 140 illustrates the speed of the first power panel 18 as the first power panel 18 is translated within the frame 14 by the panel actuation system 16 while the first power panel 18 is engaged with the second arcuate portion 124 of the cams 60, 62, 64, and 66. As shown by the line 140, the first power panel 18 has a lower velocity as it nears the second power panel 20 in order to increase the force acting on the first power panel 18 as the electrical connectors 22 are coupled. In the illustrated graph, the first power panel 18 is coupled to the second power panel 20 at a point 150. As will be appreciated, as the first power panel 18 moves away from the second power panel 20, the first power panel 18 increases in linear velocity.

Technical effects of the disclosed embodiments include systems and methods for actuating a power panel. The panel actuation system 16 may include the set of rotating shafts 44 and 46 and the plurality of cams 60, 62, 64, and 66 coupled to the rotating shafts 44 and 46 in order to enable movement and separation of the first power panel 18. More specifically, the cams 60, 62, 64, and 66 are configured to maintain a vertical orientation of the first power panel 18 as the first power panel 18 is translated within the frame 14 to improve the coupling of electrical connectors 22 of the first and second power panels 18 and 20. In certain embodiments, the plurality of cams may include first, second, third, and fourth cams 60, 62, 64, and 66 disposed in a rectangular arrangement in order to reduce tilting of the first power panel 18 (e.g., with respect to the vertical plane) as they move, thereby reducing the amount of force needed to move the first power panel 18.

Furthermore, the cams 60, 62, 64, and 66 may be designed to impart a non-constant linear speed to the first power panel 18. As will be appreciated, it may be desirable for the coupling of the first power panel 18 to the second power panel 20 to occur with a relatively low linear speed, thereby increasing the force and mechanical advantage acting on the first power panel 18 as it is coupled to the second power panel 20. As such, the cams 60, 62, 64, and 66 of the panel actuation system 16 may be configured to translate the first power panel 18 at a first, lower speed when the first power panel 18 is proximate to the second power panel 20, thereby imparting an elevated force on the first power panel 18 as electrical connectors 22 of the first and second power panels 18 and 20 are connected or disconnected to one another. Additionally, it may be desirable to translate the first power panel 18 at an increased speed when the first power panel 18 is not as close to the second power panel 18, thereby increasing the speed and efficiency of the first power panel 18 replacement. As such, the cams 60, 62, 64, and 66 of the panel actuation system 16 may be configured to translate the first power panel 18 at a second, higher speed when the first power panel 18 is farther from the second power panel 20.

Still further, in certain embodiments, the panel actuation system 16 may include one or more physical or electrical stops to limit the movement and/or torque applied to the panel when the first power panel 18 are at a certain position within the frame 14, thereby increasing the operability and protecting components of the panel actuation system 16, the first power panel 18, and the various systems (e.g., load 28) to which power is supplied via the first power panel 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a power panel actuation system configured to translate a power panel within a panel connection rack, wherein the power panel actuation system comprises:
   an input shaft; and
   a plurality of cams coupled to the input shaft, wherein the plurality of cams is configured to engage with the power panel upon rotation of the input shaft, and the plurality of cams is configured to linearly translate the power panel within the panel connection rack.

2. The system of claim 1, wherein the plurality of cams comprises first, second, third, and fourth cams disposed in a rectangular arrangement.

3. The system of claim 2, wherein the first and second cams rotate about a first axis of rotation, the third and fourth cams rotate about a second axis of rotation, and the first and second cams rotate in an opposite direction relative to the third and fourth cams.

4. The system of claim 1, wherein a linear velocity of the power panel is non-constant across a range of movement of the power panel within the panel connection rack.

5. The system of claim 1, wherein at least one of the plurality of cams comprises a cam profile comprising a first portion having a first radius of curvature and a second portion having a second radius of curvature, wherein the first and second radii of curvature are different.

6. The system of claim 1, wherein the panel actuation system comprises a physical stop to limit movement of the power panel relative to the panel connection rack.

7. The system of claim 1, wherein the panel actuation system comprises:
 a position sensor configured to detect a position of the power panel; and
 a controller configured to execute instructions to control the panel actuation system based on the position detected by the position sensor.

8. The system of claim 7, comprising a visual indicator configured to indicate a position of the power panel.

9. A method, comprising:
 decoupling an power panel from a panel connection rack with a plurality of cams configured to engage with the power panel upon rotation of an input shaft;
 linearly translating the power panel with the plurality of cams at a first speed for a first linear distance; and
 linearly translating the power panel with the plurality of cams at a second speed for a second linear distance, wherein the second speed is greater than the first speed.

10. The method of claim 9, wherein the rotation of the input shaft is substantially constant at the first speed and the second speed.

11. The method of claim 9, wherein each of the plurality of cams comprises a first camming portion configured to enable the first speed and a second camming portion configured to enable the second speed.

12. The method of claim 11, comprising limiting movement of the power panel relative to the panel connection rack after the power panel has linearly translated the first distance and the second distance.

13. The method of claim 9, wherein the plurality of cams comprises first, second, third, and fourth cams disposed in a rectangular arrangement.

14. The method of claim 13, comprising:
rotating the first and second cams about a first axis of rotation; and
rotating the third and fourth cams about a second axis of rotation in an opposite direction relative to the first and second cams.

15. A system, comprising:
a panel actuation system, comprising:
an input shaft; and
a plurality of cams coupled to the input shaft and configured to convert rotation of the input shaft into linear movement of a power panel relative to a panel connection rack, and wherein the plurality of cams are configured to maintain a vertical orientation of the power panel during the linear movement of the power panel.

16. The system of claim 15, wherein the panel actuation system comprises a lock solenoid configured to block rotation of the input shaft when the power panel is in an operational mode.

17. The system of claim 15, comprising an extendable guide configured to extend from the panel connection rack and guide translation of the power panel within the panel connection rack.

18. The system of claim 15, comprising:
a position sensor configured to detect a position of the power panel within the panel connection rack; and
a controller configured to execute instructions to control the panel actuation system based on the position of the power panel detected by the position sensor.

19. The system of claim 18, wherein the panel actuation system comprises a physical stop configured to limit movement of the power panel relative to the panel connection rack after the power panel has linearly translated a predetermined distance.

20. The system of claim 15, comprising the power panel and the panel connection rack, wherein the panel connection rack comprises a first transfer switch with a first set of one or more electrical connectors and a second transfer switch with a second set of the one or more electrical connectors, wherein the first and second transfer switches are configured to selectively direct power from a first power source or a second power source to the power panel.

* * * * *